R. R. McDONNELL.
AUTOMOBILE WHEEL AUXILIARY BEARING.
APPLICATION FILED DEC. 4, 1916.
1,254,420.
Patented Jan. 22, 1918.
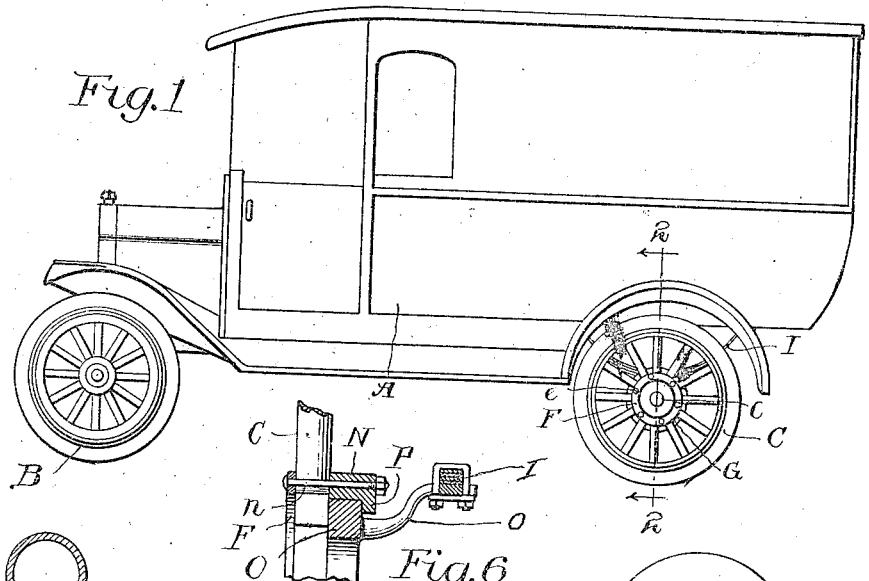
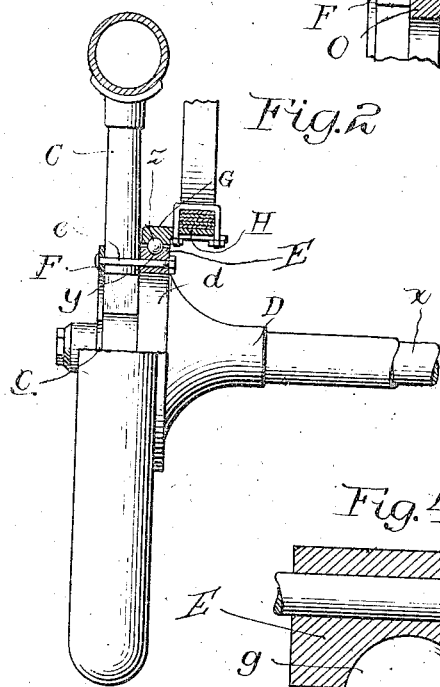
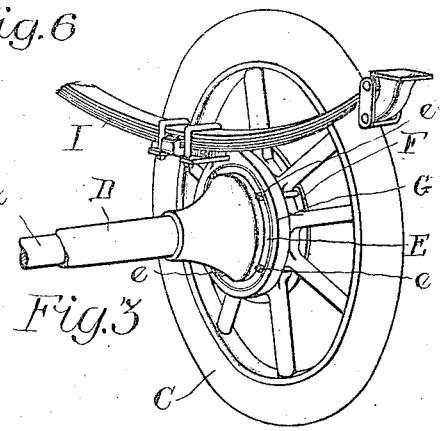
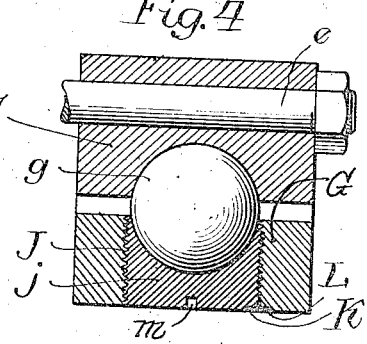
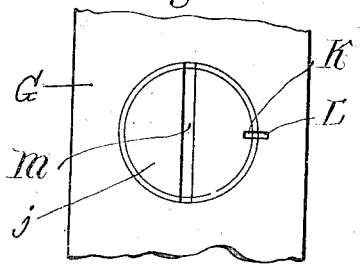
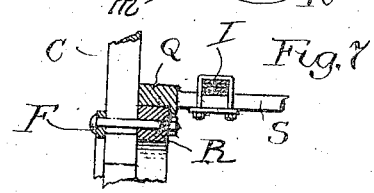
WITNESS
INVENTOR.
Raymond R. McDonnell
BY
ATTORNEY

UNITED STATES PATENT OFFICE.

RAYMOND R. McDONNELL, OF CHICAGO, ILLINOIS.

AUTOMOBILE-WHEEL AUXILIARY BEARING.

1,254,420.   Specification of Letters Patent.   Patented Jan. 22, 1918.

Application filed December 4, 1916. Serial No. 135,036.

*To all whom it may concern:*

Be it known that I, RAYMOND R. McDONNELL, a citizen of the United States of America, and resident of Chicago, Cook county, Illinois, have invented a certain new and useful Improvement in Automobile-Wheel Auxiliary Bearings, of which the following is a specification.

My invention relates to devices for imposing the load directly on the wheels of an automobile, instead of on the axles thereof, so that a heavy load can be carried without danger of breakage.

Generally stated, the object of my invention is to provide a simple and comparatively inexpensive device of this kind which can be readily applied as an attachment to an ordinary automobile, without changing the construction of the latter, whereby a comparatively light vehicle and one not primarily intended for use as such can readily be converted into a truck capable of carrying a load much heavier than that for which the machine was originally designed.

It is also an object to provide certain details and features of construction and combinations tending to increase the general efficiency and serviceability of a device or attachment of this particular character.

To the foregoing and other useful ends, my invention consists in matters hereinafter set forth and claimed.

In the accompanying drawings:—

Figure 1 is a side elevation of an automobile having the rear wheels thereof equipped with auxiliary bearings to impose the load or weight of the body directly on the wheels, instead of on the axle, embodying the principles of my invention.

Fig. 2 is an enlarged vertical section on line 2—2 in Fig. 1.

Fig. 3 is a perspective of one of the rear wheels of said automobile, showing the method of applying the auxiliary bearing and connecting the same with one of the side springs of the vehicle body.

Fig. 4 is an enlarged detail sectional view of a portion of said auxiliary bearing.

Fig. 5 is a view of the bottom surface of the parts shown in Fig. 4.

Fig. 6 is a detail sectional view showing another form of my invention.

Fig. 7 is a similar view showing another form of my invention.

As thus illustrated, the automobile body A may be of any suitable form or construction. The front and rear wheels B and C can be mounted in the usual manner, the latter on the ends of the rear axle X provided with a well-known form of housing D upon which the load is ordinarily supported, so that the weight is communicated through this housing and the axle to the wheels. To take the load off of said axle and housing, so that it will be carried entirely by the wheels C, leaving the rear axle full floating in character, a ring E is fitted over the enlarged end-portion d of the axle housing, and is secured to the wheel by bolts e which extend between the spokes and through an outer clamping ring F, whereby the tightening of these bolts will clamp the spokes firmly between the two rings. A larger ring G is arranged concentrically of the ring E, and anti-friction balls g are interposed between the rings E and G, thereby to provide an annular ball-bearing. It will be understood, of course, that rollers can be employed as a substitute for said balls, if such is desired, and that the anti-friction bearing thus provided can be of any suitable, known or approved form, so far as the broader aspects of my invention are concerned. The upper portion of the ring G is provided with an inwardly extending arm H which forms a seat for the side spring I of the vehicle body. It will be understood, of course, that the auxiliary bearing and its side spring support thus provided are duplicated at the other side of the vehicle, so that the weight of the body is imposed directly upon the two rear wheels of the automobile, the load being carried by the two auxiliary bearings and not by the bearings which are ordinarily provided inside of the housing D for the axle, and so that the axle sustains no weight whatever.

While the auxiliary bearing may be of any suitable character, it is, as a matter of further and special improvement, preferably composed of the two rings E and G, which are each made in one piece, so that when the two rings are in position and the balls g are interposed between them, the ring G cannot then be removed. This, of course, means that the balls g must be admitted to the raceway of the ball-bearing in some special manner. For example, the outer ring G may have a threaded opening J of such size that the balls can be dropped through this opening after the two rings are placed one over the other, and when the raceway of the bearing is supplied with the required number of balls, this opening J can then be closed by the plug $j$ which is screwed into said opening. To prevent this plug from forming a rough spot in the raceway, over which the balls might have some difficulty in passing, and which would cause undue wear, the plug $j$ is preferably screwed into the opening J during the process of manufacture of the bearing, and the inner end of the plug is then finished off to make it smooth and perfectly flush with the surface of the groove of the ring. Then notches K and L are cut opposite each other in the plug and ring, respectively, so that when the plug is removed and again screwed into place, it can be rotated until these two notches are again opposite each other, thus insuring accurate positioning of the inner end of the plug in exactly the same relation to the groove or inner surface of the ring that it had when the entire bearing was originally constructed. The outer end of said plug may have a slot M for a screw-driver or other tool by which the plug can be removed and then screwed into place again. This ball-bearing, it will be seen, is preferably provided with grooves which fit the balls, so that the latter not only sustain the weight of the vehicle body, but also resist lateral strain or side thrust.

From the foregoing, it will be seen that the invention provides a simple device, in the form of an auxiliary bearing, for connecting the wheels directly with the springs of the vehicle body, so that the weight of the body and the load carried thereby are communicated directly to the wheels and not through the axle and its housing. In this way, the axle is made full floating in character, by the use of attachments which are applicable to the automobile without changing the construction thereof, whereby an ordinary light passenger car can be readily converted into a truck for heavy work.

The wheel may have any usual or ordinary form of hub $c$, which in this case is secured to the end of the axle X, and with the arrangement shown the auxiliary bearing serves to take the weight off from said hub, inasmuch as this bearing is clamped to the spokes of the wheel, so that the weight is communicated from this bearing directly to the spokes and then to the rim and tire of the wheel. For this purpose, the auxiliary bearing is larger than the hub, by which is meant that it is of greater diameter than the hub, and is entirely external of the wheel. The entire bearing is applicable to the wheel as an attachment, so that the invention can be used in connection with wheels which are primarily designed and intended for use without an auxiliary bearing of this or any other kind. The bearing can be detached without depriving the vehicle of the use of said wheel; for, as soon as the auxiliary bearing is removed, the wheel can then be restored to its position on the axle, at the end of the housing D, and is then capable of operation in its intended manner.

In a ball-bearing such as the one shown and described, the two oppositely disposed grooves Y and Z form the raceway of the ball-bearing, and the opposite sides of each groove are permanently connected together, inasmuch as each groove is formed by a single piece of metal. Consequently, the opening J constitutes the only means for admitting the balls to the raceway, and for removing them therefrom. With this construction, and with this method of introducing the balls $g$ into the raceway, a ball-bearing of large diameter can be provided in a very simple and inexpensive manner, inasmuch as certain screw-threaded rings or annular members which have heretofore been employed in ball-bearings can be dispensed with and will not be necessary. It will be seen that in a bearing of large diameter the screw-threading of parts having such diameter would be more or less difficult and expensive, and might be difficult of adjustment and objectionable in use, as compared with a ball-bearing of moderate or comparatively small diameter. With the form of ball-bearing shown, the construction is very simple and comparatively inexpensive, and the weight is communicated through a large number of balls disposed in a large circle to a ring of comparatively large diameter which is secured rigidly to the spokes of the wheel, or in any suitable manner, thus substantially increasing the strength of the structure of the wheel, as well as leaving the hub and axle or other supporting member entirely free from weight.

While the invention has been described in connection with an automobile, it will be understood that an auxiliary bearing of this kind can be applied to the wheels of any vehicle, where such is desirable or necessary, either in the original construction thereof or afterward as an attachment, without departing from the spirit of my invention, and in using the term "automobile", it will be understood that I mean any vehicle to which the invention can be applied.

Moreover, it will be understood that while the invention is shown and described in conjunction with the rear wheels of an automobile, the auxiliary bearing can be used on the front wheels of an automobile or other vehicle, if so desired, as well as on the rear wheels. The entire bearing is structurally distinct from the wheel, and is removable in its entirety from the wheel, so that the removal of the auxiliary bearing leaves no portion thereof on the wheel. Of course, though, if so desired, the bearing can be incorporated in the structure of the wheel in the original manufacture thereof. But, as previously explained, and as a matter of further and special improvement, my invention preferably takes the form of an auxiliary bearing which is applicable as an attachment to an ordinary vehicle wheel primarily designed for use in the usual way and without any bearings except those ordinarily provided in the hub or on the axle. For, as also explained, one of the advantages of an auxiliary bearing of this kind is that a comparatively light automobile or other vehicle can be easily converted into a truck capable of carrying heavy loads.

As shown in Fig. 6, the outer ring N, which is substantially like the ring G previously described, is bolted to the spokes by bolts $n$, and the inner ring O, which corresponds to the ring E, is provided with an arm $o$ to support the springs I, so that in this case the weight of the load is communicated directly to the inner ring instead of to the outer ring. Furthermore, the anti-friction devices are omitted, and the two rings N and O are in direct contact with each other, except as grease or graphite or some other lubricant is interposed between. To prevent displacement of the ring O, the ring N is provided with a flange P which engages the side of the ring O, so that the latter cannot be shifted outwardly and away from the wheel while the bearing is in use.

In Fig. 7, the ring Q corresponds to the ring G, and the ring R corresponds to the ring E, but in this case no anti-friction devices are employed, and to prevent lateral displacement of the ring Q away from the wheel, a bar or spreader S is employed. In practice, the said spreader S connects the ring Q at one end of the axle with the similar ring at the other end of the axle, so that these two rings are held a fixed distance apart, and are thereby prevented from shifting toward each other, it being understood that the springs I would not be sufficient for this purpose.

From the foregoing, it will be seen that the weight of the load can be imposed either on the outer ring or the inner ring, according to requirements, and that the auxiliary bearing thus provided may be anti-friction in character or otherwise, as may be desired, without departing from the spirit of my invention.

What I claim as my invention is:—

1. In combination with an automobile wheel, an auxiliary bearing constructed with a stationary ring arranged to encircle the hub of the wheel and means to engage said ring for imposing the load of the vehicle directly on said wheel.

2. In combination with an automobile wheel, an auxiliary bearing constructed and arranged for imposing the load of the vehicle directly on said wheel, said wheel having an axle and housing therefor, and said bearing comprising a ring encircling said housing, means to attach said ring rigidly to the wheel, a member encircling said ring, anti-friction elements interposed between said ring and member, and means to support the load on said member.

3. In combination with an automobile wheel, an auxiliary bearing constructed and arranged for imposing the load of the vehicle directly on said wheel, said bearing comprising a ring disposed on the inner side of the wheel, a clamping member disposed on the outer side of the wheel, bolts extending through the wheel to connect said ring and member together, thereby to clamp the ring rigidly to the wheel, anti-friction devices engaging said ring, and means to engage said devices and thereby communicate the weight of the load to said bearing.

4. The combination set forth in claim 1, said bearing being detachable from said wheel without depriving the automobile of the use of said wheel.

5. The combination set forth in claim 1, said automobile having a rear axle upon the end of which said wheel is secured, and said bearing being detachable without interfering with the use thereafter of said wheel on said axle.

6. In combination with an automobile wheel, an auxiliary bearing constructed and arranged for imposing the load of the vehicle directly on said wheel, said wheel having a hub, spokes radiating from said hub, and said bearing being larger than said hub and having means whereby it is clamped to said spokes.

7. In combination with an automobile wheel having a main bearing, an auxiliary bearing for imposing the load of the vehicle directly on said wheel and forming a separate connection between the wheel and the vehicle, so that independently of the main bearing the wheel is connected to the vehicle, said wheel being primarily adapted and intended for use without said bearing, and said bearing being applicable as an attachment to the vehicle having said wheel.

8. In combination with an automobile wheel, an auxiliary bearing constructed and arranged for imposing the load of the vehicle directly on said wheel, said wheel being provided with an axle having a housing, and said bearing being arranged to encircle said housing.

9. In combination with an automobile wheel, a rotary axle and a stationary housing having a bearing for said axle, an auxiliary bearing constructed and arranged for imposing the load of the vehicle directly on said wheel, said bearing comprising concentrically arranged members encircling said housing and provided with opposing grooves forming a raceway, and balls in said raceway, one of said members having an opening through which to drop the balls into said raceway, provided with means to close said opening after the balls are in position in the raceway, the two sides of each groove being permanently connected together, and means to impose the weight on one of said members, thereby to take the weight off said axle and housing.

10. In combination with an automobile wheel, an auxiliary bearing constructed and arranged for imposing the load of the vehicle directly on said wheel, said bearing comprising an annular member detachably secured to the wheel, so that the axis of said member is coincident with the axis of said wheel, and means engaging said member to sustain the weight of the load thereon.

11. In combination with an automobile wheel, an auxiliary bearing constructed and arranged for imposing the load of the vehicle directly on said wheel, said bearing comprising an annular member detachably secured to the wheel to rotate therewith, a stationary element arranged concentrically with relation to said member, so that one member supports the other, and means by which to carry the load on said element.

Signed by me at Chicago, Illinois, this 20th day of November, 1916.

RAYMOND R. McDONNELL.